United States Patent [19]

Wisting

[11] 4,351,652
[45] Sep. 28, 1982

[54] FUME HOOD

[76] Inventor: Walter L. Wisting, 5 Oakdale Rd., Branford, Conn. 06405

[21] Appl. No.: 243,081

[22] Filed: Mar. 12, 1981

Related U.S. Application Data

[63] Continuation of Ser. No. 865,793, Dec. 30, 1977, abandoned, which is a continuation of Ser. No. 522,536, Nov. 11, 1974, abandoned.

[51] Int. Cl.³ ............................................. B01D 47/00
[52] U.S. Cl. ....................................... 55/229; 55/234; 55/240; 55/467; 55/DIG. 36; 126/299 E; 261/106; 261/114 R
[58] Field of Search ................. 55/229, 233, 234, 240, 55/467, DIG. 36, 223; 126/299 E; 261/100, 106, 114 R

[56] References Cited

U.S. PATENT DOCUMENTS

| | | | |
|---|---|---|---|
| 907,633 | 12/1908 | Narowetz | 55/240 |
| 2,090,466 | 8/1937 | Bichowsky | 55/228 X |
| 2,392,601 | 1/1946 | Long | 55/240 X |
| 2,641,331 | 6/1953 | Hudson | 55/525 X |
| 2,943,920 | 7/1960 | Hoover | 261/114 R X |
| 3,010,706 | 11/1961 | McWilliams | 261/100 |
| 3,266,224 | 8/1966 | Ferretti | 55/240 X |
| 3,370,404 | 2/1968 | Leeper | 55/240 X |
| 3,485,015 | 12/1969 | Vecchio | 55/270 X |
| 3,616,744 | 11/1971 | Jensen | 98/115 K |
| 3,731,462 | 5/1973 | Costarella et al. | 55/DIG. 36 X |
| 3,866,333 | 2/1975 | Sarukahanian et al. | 55/241 X |
| 3,876,399 | 4/1975 | Saponaro | 55/228 |
| 3,893,831 | 7/1975 | Doane | 55/DIG. 36 X |

FOREIGN PATENT DOCUMENTS

| | | | |
|---|---|---|---|
| 13222 | of 1905 | United Kingdom | 55/240 |
| 1231710 | 5/1971 | United Kingdom | 55/240 |

Primary Examiner—Kathleen J. Prunner
Attorney, Agent, or Firm—Costas, Montgomery & Dorman

[57] ABSTRACT

A fume hood removes cooking odors such as grease from the air by providing positive contact with a recyclable water-detergent solution, thus serving to condense and emulsify the grease and thereby remove it. Positive contact with the water is caused by having a water-washed screen across the inlet of the hood, the screen having a mesh designed to cause a close interweaving of the air and water. The air then passes through the remainder of the hood and any remaining grease is removed by turbulent contact of air and water in the passage or along the inner sides of the hood. Through a series of one or more sloping dividers in the exhaust hood, the input recycled water may also create additional "waterfall" washing steps.

The unit is maintained substantially at room temperature, even though receiving heated contaminated air, due to heat absorption by water evaporation in the washing process.

4 Claims, 7 Drawing Figures

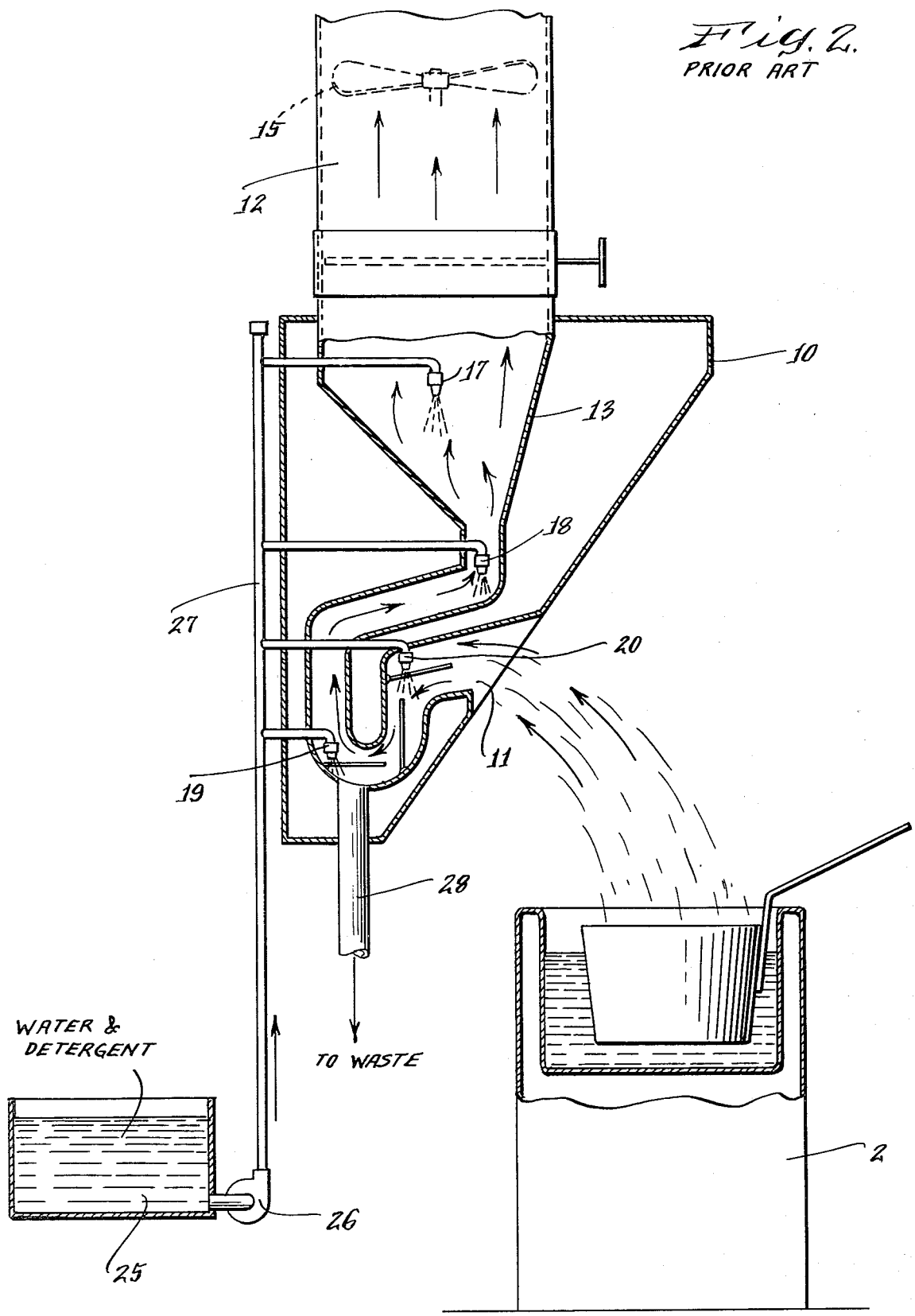

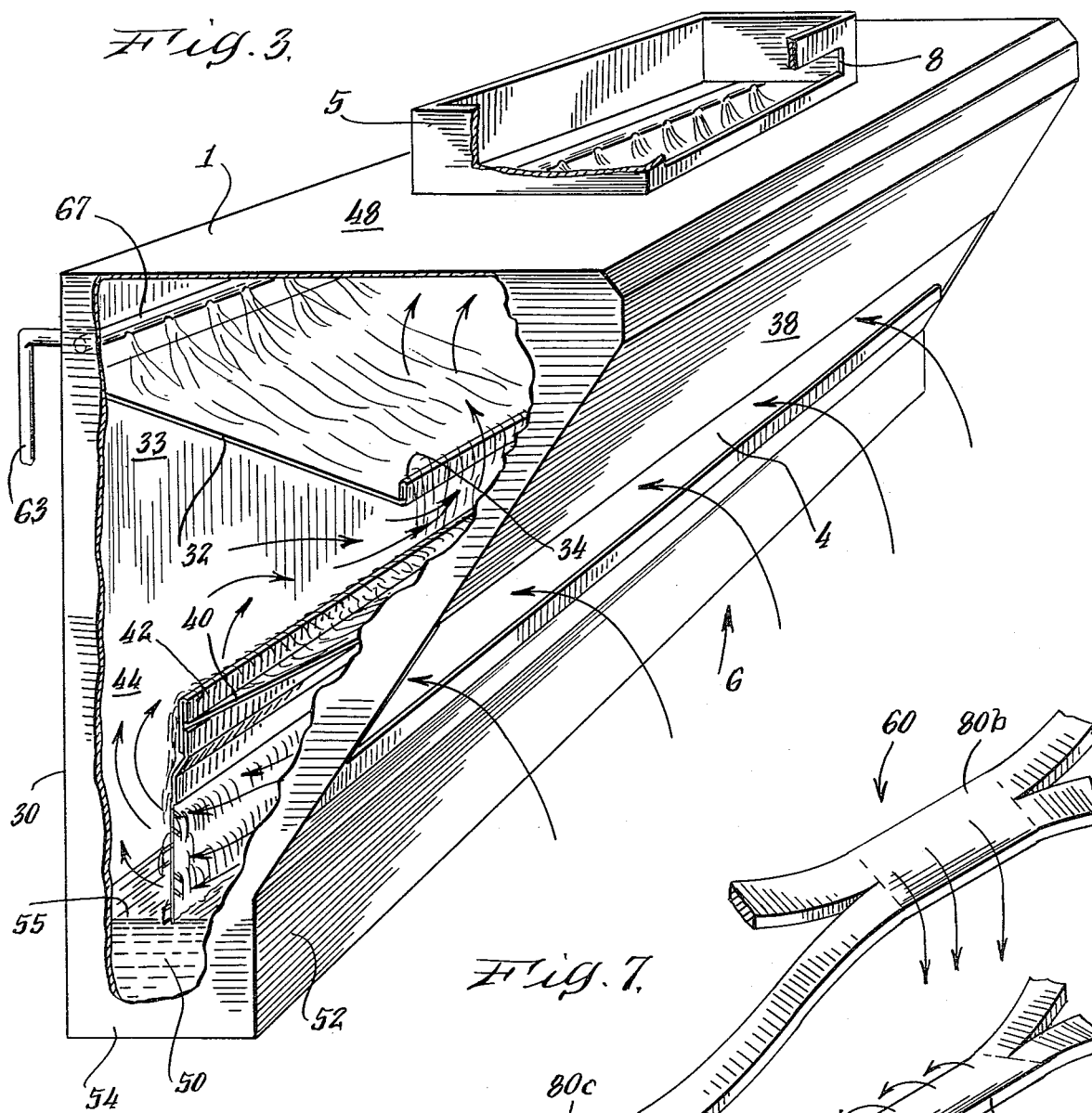
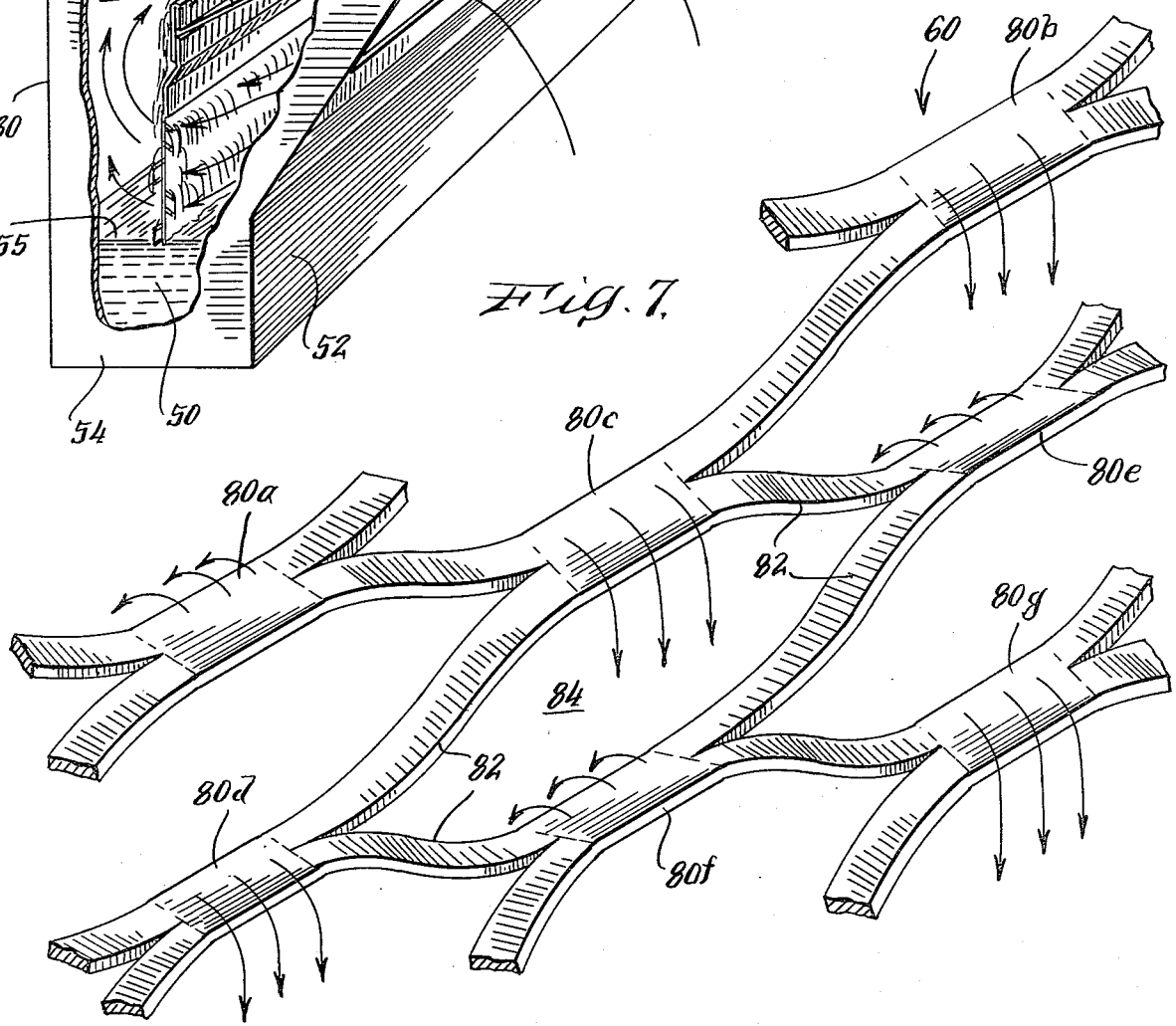

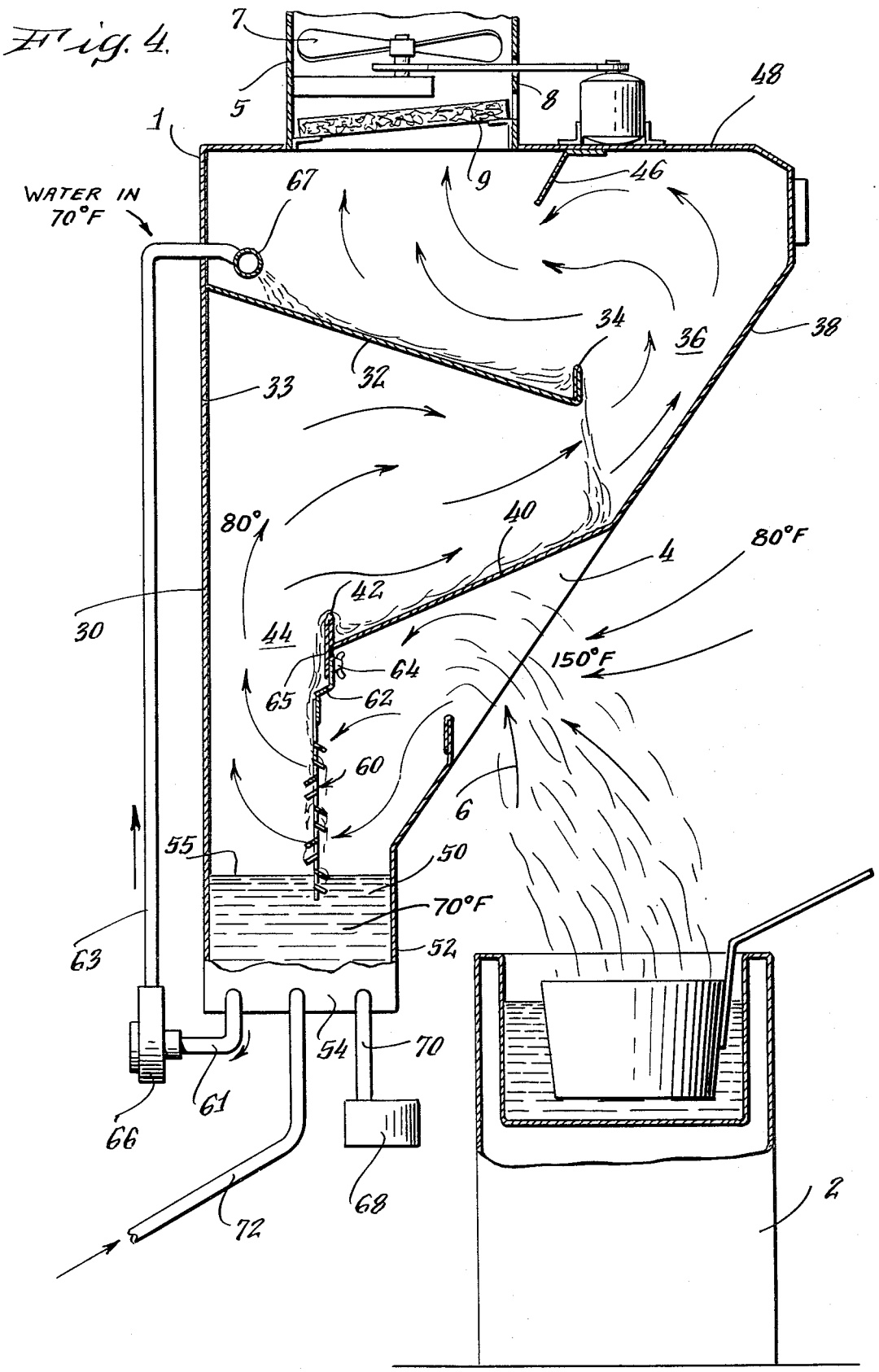

FUME HOOD

This is a continuation of application Ser. No. 865,793, filed Dec. 30, 1977, which was a continuation of application Ser. No. 522,536 filed Nov. 11, 1974, both now abandoned.

BACKGROUND OF THE INVENTION

In restaurant kitchens fume hoods are necessary to remove cooking odors, especially over deep fat frying equipment where the fumes include a considerable amount of grease.

Prior art systems include an exhaust fan and a duct system for drawing the air from the cooking surface into the duct and out an outlet. They sometimes include screens or filters for collecting the grease. Since such screens require considerable cleaning, the preferred system has been to let the grease be eliminated from the air by having it stick to the inside surface of the duct carrying the air. This not only is an inefficient and unsatisfactory method of removing the grease, but also, because of the heat involved, the grease tends to bake onto the inner surface of the ducts and is difficult to remove. This also creates a fire possibility. In fact, most fire codes require a spring-loaded fire damper to close the top of the duct in the event of fire.

In systems such as these, inside of the duct is cleaned when the hood is not being operated by using one or more spray nozzles permanently mounted inside the duct to scrub down the baked on grease.

A variation on this prior art technique is a system in which one or possibly more spray nozzles are mounted somewhere within the duct. These operates while the hood is in operation and have as their purpose to cool the air so that better condensation of the grease on the sides of the duct will be obtained. Normally, this provides only nominal air-water contact so only a small amount of grease will actually be removed by the water. To the extent that grease is removed by the water, it could cause clogging unless there is a periodic detergent cycle in which the fan is turned off; otherwise the grease may be carried in the water droplets and stick to the fan blade that operates the unit.

"Waterfalls" have been used in industrial air scrubbers, in association with other steps, but normal waterfalls are subject to being "punctured" by an air stream, i.e., develops holes or voids in the waterfall permitting such of the air to pass through the holes without contacting the water. See, for example, the patents to Fisher U.S. Pat. Nos. 2,259,032 and 2,354,674, McIlvaine U.S. Pat. No. 3,077,714, and Wisting U.S. Pat. Nos. 3,336,733, 3,406,498 and 3,448,562.

SUMMARY OF THE INVENTION

In the system of the present invention the grease and other fumes are removed from the air, not by having them stick to the inside of the ducts, or be removed by screens, but rather through direct and positive contact with a recycling water-detergent mixture. The water cools the grease to solidify it; and it is emulsified by the detergent and drops to a sump. The system is positive in action in that it insures that substantially all of the contaminated air actually contacts the water, so solidifying and emulsifying the grease or other contaminant and providing for much of its removal in the beginning of the cleaning cycle.

Positive contact of the entering air with the water stream is provided by having a mesh-like water control screen, vertically mounted, crossing the entire entrance opening and providing for a steady flow of this water over this mesh.

The screen has openings large enough to permit ready air flow, but small enough to prevent "puncturing" of the water by the air. Preferably the mesh is designed to direct water toward the incoming air stream so that the air then causes the water to fill the interstices of the mesh and block them, rather than push the water away from the mesh. Some of the air may also be directed away from the incoming air to create a "waterfall" giving a second wash.

The internal design of the hood showing the air flow pattern is shown (in cross-section) in FIG. 4. The hood is generally triangular in shape with the "base" at the top where the outlet duct is positioned. It has two sides, front and back walls, and top and bottom surfaces. Inside the hood are two sheet metal dividers, the upper one affixed to the back wall and tending downwardly and forwardly and the lower one being affixed to the front wall and tending downwardly and backwardly. Each has a flange at its lower end and so forms a level trough at the lower end of the divider. Water is injected at the upper portion of the upper divider and flows down to collect in the trough and overflows forming the first "waterfall" (substantially uniformly along the length of the trough). It then flows downwardly along the upper surface of the lower divider to a second flange trough formation. It flows over it and downwardly. In this instance, however, the previously referred to mesh is mounted below the lower divider so that the "waterfall" falls along and is controlled by this mesh.

The hood and dividers provide a passage for air flow from inlet to outlet. The air enters below the bottom divider, passes through the water mesh, goes upwardly in a turbulent motion between the two dividers, passes through the upper waterfall, and continues its turbulent motion to the upper outlet in which there is a suction fan. The turbulent motion of the air within the system serves to moisten all of the inner surfaces of the hood and so serves further to collect fumes and grease from the air by contact with water on the surfaces and in the turbulent air. The turbulence also keeps the unit cool since a certain amount of water evaporates in the presence of the turbulent air and so cools the unit.

At the base of the unit is a sump to hold water. A recirculating pump is provided so that water can be recirculated to the top of the unit. There is also an inlet pipe for adding more water-detergent mixture, and a sensing mechanism for maintaining the water level.

DETAILED DESCRIPTION OF THE INVENTION

The attached drawings show the invention:

FIG. 2 is a side elevation of one type of prior art restaurant hood.

FIG. 3 is a perspective view of the hood of the invention, partially broken away to show the inner structure.

FIG. 4 is a section taken across the hood showing the details of construction and operation of the hood.

FIG. 7 is a perspective of a portion of the mesh of FIG. 6 showing the water flow pattern.

DESCRIPTION OF THE PREFERRED EMBODIMENT

Figure 1:
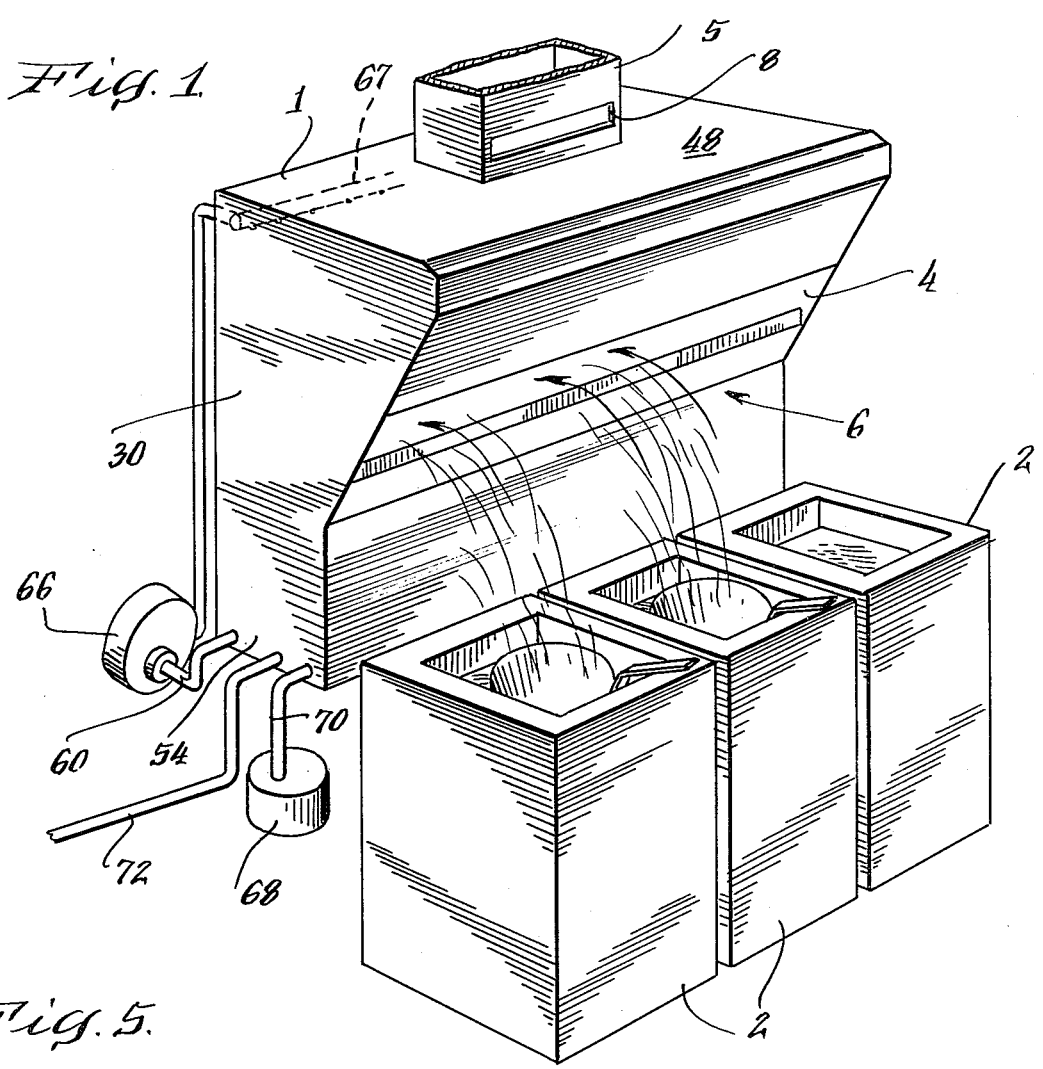
FIG. 1 is a perspective view of the hood of my invention mounted above three deep fat frying units and so positiond as to draw the fumes away from those units.

FIG. 1 is a perspective view showing the appearance of my invention to the casual observer. The hood 1 is wall mounted above the cooking area. In this instance it is mounted above three deep fat fryers 2. It has an air intake 4 defined in the front wall of hood 1 above and to the rear of fryers 2 and an air outlet 5. Lines 6 indicate the air flow from the cooking area into inlet 4. Outlet 5 may include an outlet fan 7 and a slot 8 for insertion of a moisture extractor 9 (FIG. 4).

It will be noted that general outer configuration, size, and positioning of the unit are substantially the same as in prior art exhaust hoods. Viewed from the side the hood has the appearance of an inverted right triangle with the hypotenuse portion over the cooking area. It does have one difference from some existing structures in that the lowermost portion of the unit, viewed from the side has a rectangular shape.

Before considering the structure of our invention in more detail, it may be useful to consider the structure of one type of prior art fume exhaust hood. It is not suggested that there are not other kinds of hoods, but the one to be described is believed to be relatively typical.

FIG. 2 shows a prior art exhaust hood 10 including inlet 11 and an outlet 12. Between the two and interconnecting them is duct 13. Duct 13 has a somewhat tortuous path and does not occupy the entire space within the hood structure 10, thus leaving less room for cleaning action.

As mentioned above, the cleaning action takes place by the deposition of grease on the inside of the duct 13 as the air is drawn between inlet 11 and outlet 12 by the fan 15.

Within duct 13 are a series of spray nozzles, 17, 18 and 19. Normally, these nozzles are only used when the hood is not being operated and are for the purpose of spraying a combination of detergent and water within duct 13 in order to clean the inner surfaces. The water-detergent mixture comes from a supply 25 through pump 26 and inlet line 27 to the various spray nozzles. The water with the grease is removed through waste line 28.

It is possible in this unit that one spray nozzle, such as nozzle 20, may be on during operation to spray water on the incoming air. This is to cool the air slightly so that the grease more readily condenses on the inside of duct 13. The use of such a cooling water nozzle does not provide positive contact of the water with the incoming air, but is of a more random nature. Likewise, it does not serve to wet down the inner surfaces of the duct 13, for to do so would be to prevent them from receiving grease from the air and so removing it.

Turning now to the present invention, as shown in FIGS. 1, 3, 4, 5, 6, and 7, it will be seen that the hood 1 includes an outer shell or housing member 30 with sheet metal dividers mounted therein. These dividers extend for the full width of the hood and include divider or partition 32 secured to the back wall 33 and side walls 54 of shell 30, angling downwardly, and having an upwardly extending flange 34 throughout its length at its lower free end, and a second divider or partition 40 secured to the lower end of front wall 38 and side walls 54 of shell 30 and angling downwardly toward the back wall. Front wall 38, as shown in FIG. 4, continues into downwardly directed partition 40 which partially defines inlet opening 4. It, too, has an upwardly extending flange 42 at its lower free end. Preferably, the dividers are secured to the walls in a manner preventing water passing between the walls and the dividers. The upturned flanges 34 and 42 define dams.

There is a gap 36 between flange 34 and front wall 38 of the hood and a gap 44 between flange 42 and back wall 33. The gaps are for the passage of air. This use of dividers results in reversal of direction in the air passage and "waterfalls" in the gaps.

With the construction described, the upper and lower partitions define an air passage therebetween of decreasing cross-sectional area, and the cross-sectional area of the passage above said upper partition increases. It will be noted that divider 40 can, if desired, be simply a continuation of front surface 38 of the hood, and that the flanges 34 and 42 can be most readily made by bending the lower portions of dividers 32 and 40, respectively. As mounted, the upper edge of flanges 34 and 42 should be horizontal and extend for the full width of the hood. This will result in substantially uniform waterfalls.

A deflector 46 may be secured to the upper wall 48 and inclined downwardly to deflect air passing through the hood downwardly toward the upper surface of divider 32.

The lower portion of hood 1 has a sump 50 formed between back wall 33, the lower section of front wall 52, the two side walls 54 (only one of which is shown in the drawings), and the bottom of the unit. Sump 50 carries a water-detergent mixture, the upper level of which is indicated by the numeral 55. The level of the liquid in the sump is below intake opening 4, and screen 60 depends below liquid level 55.

The entire unit as described, aside from the mesh screen and the water and air handling facilities are made of sheet metal, preferably stainless steel. It will be noted that the entire internal volume of the unit (except the sump) is used as a passage to carry the air and clean it, and, so, as will be described below, not only is a unique concept of operation used, but there is also more operative volume in which the air may be cleaned.

Returning to the structure of hood 1, a water-control screen 60 is positioned beneath flange 42 and slightly inward from flange 42. The uppe end 62 of screen 60 has means 64 to secure the unit in its desired position beneath and slightly inwardly of flange 42. This means can be of any desired nature but, most simply, can be accomplished by having flange 42 also extended downwardly below divider 40 so a series of metal screws or thumb screws will secure upper end 62 to the lower portion 65 of flange 42. The lower end of screen 60 extends below the upper surface 55 of the liquid in sump 50.

The upper edge of wall portion 52, which defines the lower edge of inlet opening 4, terminates below the lower edge of partition 40.

For the purposes of positive water contact, as will be more fully described below, it is necessary that all of the incoming air pass through screen 60. Therefore, screen 60 must extend the entire width of hood 1 and must have its lower end below the liquid level 55. Its upper section 62 and the lower section 65 of flange 42 also extend the full width and are impervious (or, if not impervious, of a screen design similar to that of screen 60).

Figure 5:
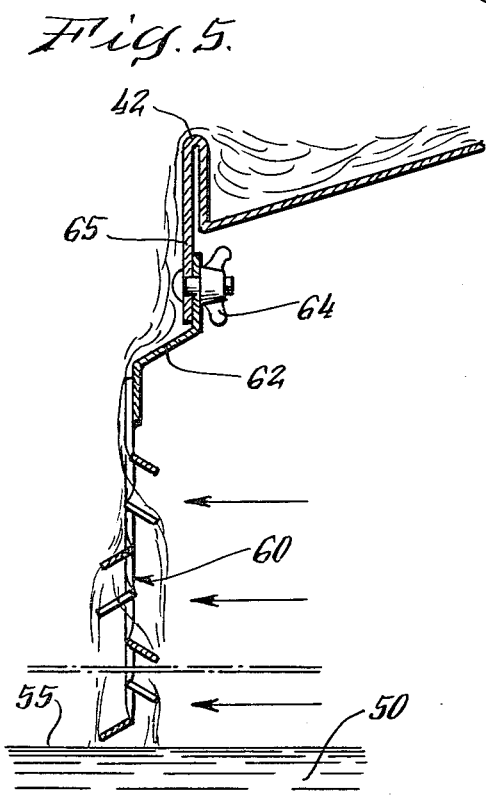
FIG. 5 is a portion of FIG. 4 showing in more detail how the water flows over the mesh surface at the entrance to the unit so that all of the air contacts the water.
Figure 6:
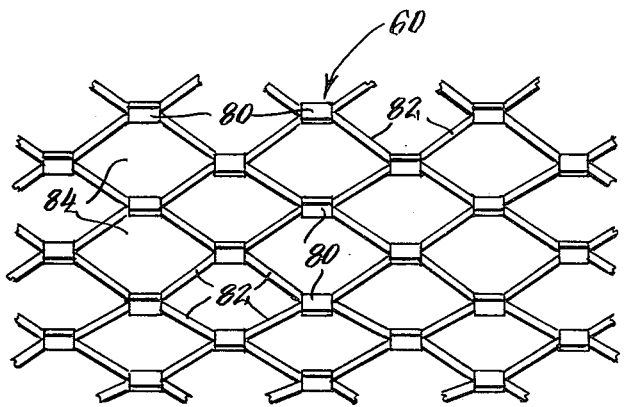
FIG. 6 is a front view of the mesh as seen from the air inlet direction.

Screen 60 is shown in detail in FIGS. 5, 6, and 7. It has a design that directs water passing down the screen on either side of the screen. Other screen designs may be used, but this design is found preferable.

Water control screen 60 is formed from flattened, stainless steel expanded metal by using a die that gives the screen the configuration desired. The screen includes water deflectors 80 which form junctions for interconnecting bars (air flow dividers) 82. Deflectors 80 and bars 82 define a series of diamond-shaped interstices 84. The desired size of interstices 84 may vary depending upon water volume on screen 60 and velocity of air flow, but the size which appears best for usual fume hoods is to have a height of about $\frac{1}{4}$ and a length of about $\frac{1}{2}''-\frac{5}{8}''$. They should be small enough to substantially reduce puncture of the waterfall (which destroys efficiency), and at the same time no smaller than necessary to accomplish the desired cleaning, since the smaller they are, the greater resistance they provide to air flow.

Water deflectors 80 are angled out of the plane of screen 60 to deflect the water passing down the screen slightly outwardly from it. Thus, they act as a series of small vanes. Preferably, they are angled alternatively in opposite directions (alternating in both the horizontal and vertical directions). Thus, in FIG. 7, deflectors 80a and 80b and deflectors 80d and 80e are, respectively, in the same horizontal lines and alternate in direction; and deflectors 80c and 80f and deflectors 80b, 80e and 80g, are, respectively, in the same vertical lines and alternate direction. It can be seen that deflectors 80a, 80e, and 80f deflect water away from the viewer, and the others toward the viewer.

The angle of deflection should be such that, under the conditions of operation, water deflected toward the incoming air stream will be pressed back by the stream and fill the respective interstice 84. This use of deflectors, then, provides an additional means of creating a waterfall that will not be substantially punctured. As a result the passing air comes into more intimate contact with the falling water. Since the deflectors alternate in direction, water deflected toward the air stream fills the two interstices 84 directly below its deflector.

Deflection away from the stream is optional, but does serve to provide a second washing action for the air after it has passed through screen 60.

Associated with the hood and the sump 50 is a water circulating system. This includes outlet pipe 61 connected to the bottom of sump 50, a pump 66, a riser 63 for carrying water upwardly and into the interior of hood 1 above divider 32. There riser 63 leads to a header 67 with a series of nozzles or holes along the upper edge of plate 32 for applying the water-detergent mixture to plate 32.

If desired, a source of additional detergent and water 68 may be provided through inlet pipe 70 to sump 50 to add additional water-detergent mixture as needed. Source 68 may be controlled in any method desired, such as having probe 72 inserted in sump 50 to measure factors such as pH of the liquid to determine when more detergent is needed.

The operation of the unit can best be described by considering the water flow pattern, the air flow pattern, and the grease removal pattern.

Water Flow Pattern

At the commencement of operation the water-detergent mixture is inserted in sump 50 and should be of sufficient volume so that it can not only maintain level 55 with the screen 60 immersed within but also provide volume for the flow pattern to be described.

When pump 66 is turned on, water-detergent mixture is drawn from sump 50 through pipe 61 and forced up riser 63 and out header 67. The holes or nozzles on header 67 are adequate in number so that the entering water covers substantially the entire upper surface of divider 32. The water flows downwardly on divider 32 and is held in the trough formed by plate 32 and flange 34. When sufficient water has collected, it overflows the upper edge of flange 34 substantially uniformly along its entire length (i.e., the entire width of the fume hood) to cause a "waterfall" to drop down to the upper surface of lower divider 40 (or the inside of front surface 38). Once the process starts, the waterfall will cover gap 36 so that any air which flows through gap 36 must first pass through the water falling off flange 34.

When the water reaches divider 40, it flows downwardly to the trough formed by flange 42 and, in the same manner, will flow over the upper edge of flange 42 throughout its entirety (i.e., once again, the entire width of the hood). The water drops to screen 60, passes down the water control screen 60 as previously described and finally ends up in sump 50. It can then be recirculated by pump 66.

Since the upper edges of flanges 34 and 42 are horizontal, the flanges serve as flow equalizers, giving uniform water flow over them throughout their lengths.

A portion of the water interacting with the incoming air will evaporate. This water, as water vapor, flows upwardly with the air and out outlet 5. Evaporation of the water serves to keep the temperature of the water low and, therefore, cool the unit.

Due to the turbulence within the fume hood and the passage of air, minute particles of water will be found throughout the hood, serving further to clean the air. In addition, this will also cause substantially the entire inner surface of divider 32 and the surfaces of deflector 46, to be moistened with the water-detergent solution. As a result, air passing through the unit and striking the surfaces will have further grease and fumes removed. However, the removed matter will not stick to the surfaces, but will flow downwardly on the moist surfaces and end up in the sump 50.

Air Flow Pattern

A fan 7 is mounted within the outlet 5 to draw air through the fume hood. This serves to draw contaminated air from the cooking area into inlet 4.

Just after entering inlet 4, the air is drawn through water control screen 60 which, as stated above, is covered with the water-detergent solution. Because of the nature of the screen the air makes a positive contact with the water and it is unlikely that large "holes" in the water stream will be formed by air flow (through which holes some of the air might pass without contacting the water). Rather, the air would appear to cause the water to fill interstices 84, preventing voids in the water, and so cause the air to "interweave" with the water, making much more positive contact.

Contact of the air and the water serves first of all to cool it from its entering temperature (often in the range of 150° F.). This cooling serves to solidify much of the grease so that it can no longer be carried by the air but is removed by the water. In addition, the water-detergent solution, in striking the air, serves to scrub the air and remove further grease and other odors. These flow down with the water into sump 50.

After passing through screen 60, the air is drawn upwardly through gap 44 into the chamber defined by dividers 32 and 40 and reverses its direction. Due to the non-uniform path, considerable turbulence is created in the air. As a result, inner surfaces are moistened. It is also found that a certain number of water droplets are carried by the air as a result of passing through the screen 60.

This turbulent action and contact with surface and water droplets serves further to scrub the air and remove the contaminants. The turbulence also serves to reduce "voids" in the waterfall through gap 36 by disrupting the pattern of voids and also filling them with water droplets.

The air then passes upwardly through gap 36, again reverses directions, and continues its turbulent motion in the upper chamber between the top surface of divider 32 and outlet 5. The air is baffled downwardly by deflector 46. Continuing turbulence plus contact with water droplets in the air, water in divider 32, and water on the sides of the unit serves further to clean the air.

The air is then drawn by fan 7 through water extractor 9 and discharged through outlet 5. Extracted water drains back into the unit.

Grease Removal Patttern

In due course all of the water within the unit, except for any small portion that is drawn out the outlet fan in evaporated or atomized form, drains downwardly into sump 50, carrying with it the grease and contaminants. To the extent that the contamination is grease, it will rise to the top surface 55 in sump 50 and can be skimmed off. To the extent that the contaminant is not separable from the water-detergent mixture, the mixture can be replaced on a periodic basis, such as once a day.

It has been found that the system of this invention serves to do a successful job of cleaning the air before it is discharged into the atmosphere, reduces risk of fire and operates at a relatively cool temperature. It may be used in various situations where fumes are to be removed.

I claim:

1. A hood adapted to remove contaminants from incoming airflow and adapted to be positioned above a cooking apparatus comprising a housing member, said housing member having top, front, back and side walls, and defining a lower liquid sump, an upper exhaust opening in said top wall, an inlet opening defined in the front wall of said housing member above said defined sump, an upper partition extending between said side walls from said back wall and having a free end defining an air passage between said upper partition and said front wall, said upper partition being inclined downwardly toward its free end, a lower partition extending between said side walls from said front wall and having a free end defining an air passage between said lower partition and said back wall, said lower partition inclined downwardly toward its free end, the free end of said lower partition overhanging said sump, said upper and lower partitions defining an air passage therebetween of decreasing cross-sectional area to said air passage defined by the free end of said upper partition and said front wall whereby a tortuous air passage is defined from said inlet opening about said lower partition, between said partitions, between said upper partition and said front wall and to said exhaust opening, a screen having openings therein extending between said side walls and from the free end of said lower partition into said sump, said screen and said back wall defining an air passage of a lesser cross-sectional area than said air passage between said partitions adjacent said back wall, each of said partitions having means on the free ends thereof defining a liquid dam having a horizontal upper edge, and means for drawing liquid from said sump and delivering the liquid substantially uniformly to the upper surface of said upper partition whereby the liquid will overflow the dam on said upper partition and fall in a sheet to said lower partition and thereafter overflow the dam on the free end of said lower partition, and move across the screen and the openings in said screen to said sump, whereby air passing into said inlet opening and through said housing member passes through the liquid moving across the openings in said screen and then through a sheet of liquid overflowing the dam of said upper partition, and means for moving air through said housing member.

2. The hood of claim 1 where at least a portion of said inlet opening is above the free end of said lower partition.

3. The hood of claim 1 where the liquid delivered to said upper surface of said upper partition is the only liquid contacted with the air passing through said hood.

4. The hood of claim 1 wherein said screen comprises a sheet of expanded metal defining strips between junctures and said junctures are offset from the normal plane of the sheet to provide vanes on either side of said plane whereby the liquid will move from one vane to another across the openings in said sheet.

* * * * *